United States Patent

Wright et al.

[15] 3,643,056
[45] Feb. 15, 1972

[54] FLUX DEPTH INDICATOR

[72] Inventors: Jerry J. Wright; William H. Curtis, Jr., both of Wellsville, N.Y.

[73] Assignee: The Air Preheater Company, Inc., Wellsville, N.Y.

[22] Filed: Oct. 23, 1970

[21] Appl. No.: 83,553

[52] U.S. Cl. .......................................................... 219/73
[51] Int. Cl. ........................................................ B23k 9/18
[58] Field of Search .................................... 219/73, 126

[56] References Cited

UNITED STATES PATENTS 2,395,723  2/1946  Chimielewski .......................... 219/73
2,972,041  2/1961  Mosny et al. ............................ 219/73

Primary Examiner—J. V. Truhe
Assistant Examiner—Gale R. Peterson
Attorney—Wayne H. Lang and Eldon H. Luther

[57] ABSTRACT

An arrangement for measuring the sufficiency of flux present in an electroslag welding process. In electroslag welding a space is formed between parts to be welded and a wire electrode is fed into said space through a tubular flux coated guide, both wire and guide including the flux thereon being melted to form the weld between parts when heat produced by resistance to electricity flowing therethrough is sufficient. The quality of the weld produced, is to a large extent, dependent upon the adequacy of the flux present at the site of the molten metal forming the weld. Frequently however, the weld is obscured from direct observation and only by indirect sensing as permitted by an arrangement such as provided by this invention is it possible to determine the quality of the weld being made.

4 Claims, 1 Drawing Figure

PATENTED FEB 15 1972
3,643,056
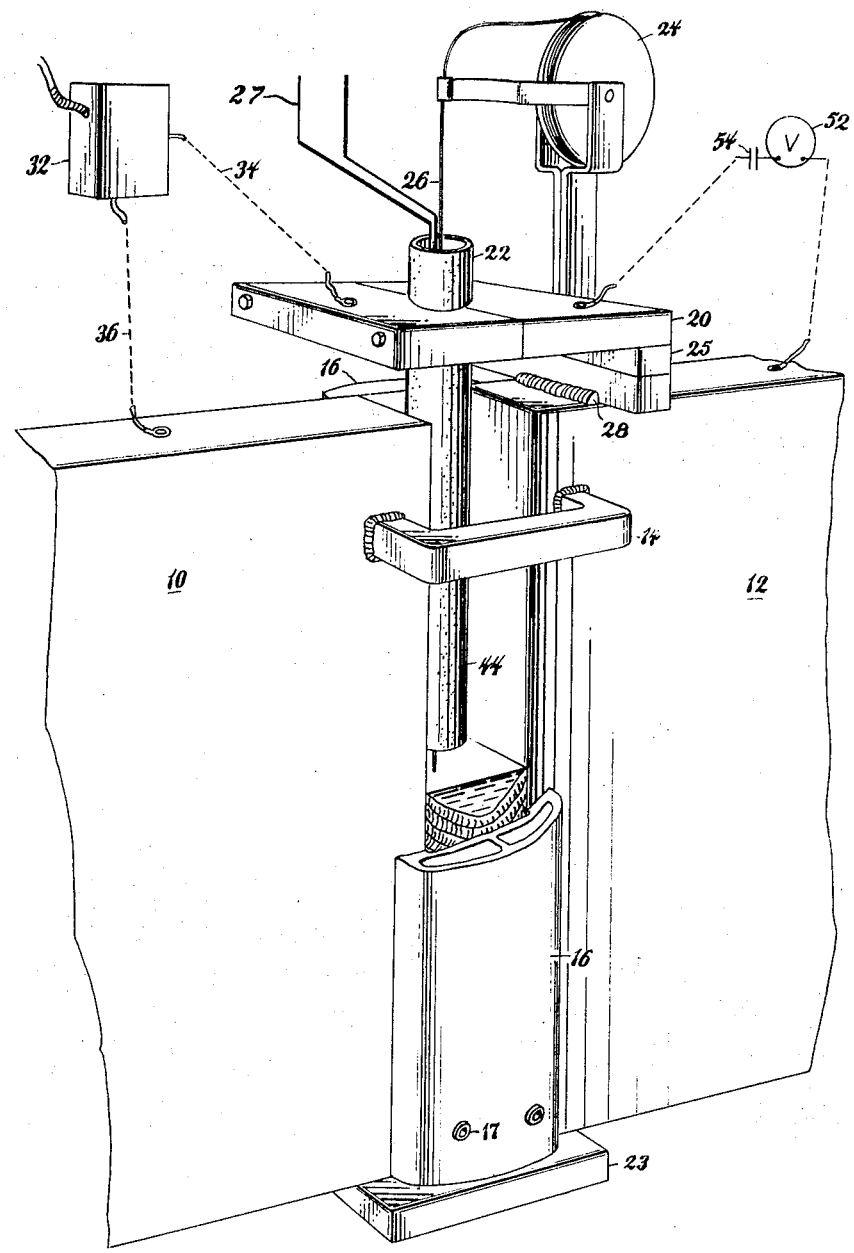
INVENTOR.
Jerry J. Wright
BY William H. Curtis Jr.
Wayne H. Lang
AGENT

FLUX DEPTH INDICATOR

BACKGROUND OF THE INVENTION

One form of electroslag welding is performed by a process by which two or more parts to be welded together are first spaced apart to provide a space into which a tubular consumable guide is inserted. A wire electrode is fed through the consumable guide and reduced to a molten state by heat from resistance to an electric current which is directed through the guide and/or the wire electrode. As the molten metal cools and solidifies it joins together the spaced parts.

The weld metal formed by the molten electrodes forms a liquid pool intermediate the spaced parts which are shielded by a floating layer of molten slag or flux. The flux may be admitted to the welding process as a coating on the welding wire or consumable tube, it may be added from an external source as required, or it may be presented to the welding operation by any combination of the above-named processes.

Until the present invention, it was difficult to determine the adequacy of the welding flux at the site of the welding operation. Inasmuch as the heat required for welding is generated by resistance to the electric current as it passes from the wire electrode to the parts to be welded through the molten weld metal and the layer of welding flux or slag therebetween, the proper temperature is to a large extent dependent upon the presence of the proper amount of slag. Moreover, the slag contains elements essential to the quality of the weld. Therefore it is necessary that the layer of slag at the site of the molten weld material be maintained in the proper amount to produce a weldment having the necessary high quality.

Water-cooled shoes are provided at each side of the welding joint to cool the molten welding metal and to act as a form that regulates the contours bounding the outer surfaces of the weld. A closure is also welded to the bottom of the space to serve as a temporary holding means for the liquid welding metal. While such arrangements are a necessary part of the welding operation, they preclude observation of the welding process and, in many cases, only after a job is complete and the cooling shoes are removed may the quality of a weld be correctly assessed.

SUMMARY OF THE INVENTION

This invention relates to an electroslag welding process and apparatus wherein readily available instrumentation may be used to continuously monitor the quality of a weld being produced, however inaccessible or obscure the location may be.

The method and apparatus of this invention may be used on conjunction with any of the prior art electroslag welding devices to maintain an optimum amount of flux at the site of the incipient weld.

It is therefore the principle objective of this invention to provide a method and apparatus that will continuously monitor the quality of a weld being produced, while a signal produced thereby may be used to trigger an automatic addition of flux or otherwise call for the manual addition of a suitable flux whereby it may be maintained at suitable levels at all times to produce an optimum weld.

BRIEF DESCRIPTION OF THE DRAWING

The single FIGURE is a schematic view of an electroslag welding apparatus employing the present invention.

DESCRIPTION OF THE PREFERRED EMBODIMENT

In the present invention the metallic elements 10 and 12 are to be butt-welded together. They are accordingly spaced apart a suitable distance and clamped in position or joined by one or more temporary holding bars 14 that are welded thereto. Also present, at each side of the space to be welded is a cored copper containment shoe 16 having ports 17 through which cooling water is circulated in accordance with standard welding procedure to prevent unwanted fusing of the containment shoe to the weld. A bracket or holding means 20 holding a welding tube 22 and a reel 24 carrying a supply of welding wire 26 is temporarily secured as by welding at 28 to the top surface of either element 10 or 12, while a plate 23 is temporarily welded to the bottom of the elements 10 and 12 to contain the molten welding metal in the space between the elements.

One or more consumable guides 22 of tubular form and comprised of welding metal having a suitable composition are mounted in the bracket 20 above the space to be welded so that they extend downward in spaced relation with the bottom of said space between the elements 10 and 12. A consumable wire electrode 26 also having a predetermined composition is supplied through the interior of the consumable guide 22 from the reel 24 to the location of the desired weld. The consumable guides 22 may be made stationary or they may be made to oscillate across the space to be welded to provide an even distribution of heat in the welding material in accordance with standard welding procedure. Welding current is supplied from a conventional power supply 32 through cables 34 to the bracket 20 that holds the consumable guides 22. A ground cable 36 is clamped to one of the plates 10 whereby a welding circuit is completed when the electric current passes therethrough. The wire electrode 26 is fed through the consumable electrode from the wire reel 24 in accordance with the rate at which the consumable electrode is used. Suitable insulation 25 precludes a short circuit bypassing the welding site at the lower end of the tube 22.

A welding flux 44 in an amount determined by theoretical requirements and practical experience is usually coated on the surface of the consumable guides 22 so that it is present at the precise site of the weld being formed.

Heat for welding is generated by the resistance of the molten metal and flux to the passing of electricity therethrough. As heat is generated, the molten metal from the welding wire 26, the consumable tube 22 and an adjacent portion of each plate 10 and 12 is melted, and as additional weld metal is reduced to a molten form other metal at the bottom of the joint cooled by water in jacket 16 solidifies to form a bond between the plates 10 and 12. Additional slag is provided as the guide tube 22 melts and the flux thereon is released, or it may be added in bulk form as desired from an outside source by manually pouring it down funnel 27 through the tube 22. Usually however, conventional welding procedures leave no way for determining the precise point at which additional flux should be added to the operation or the amount necessarily added so that an optimum weld is produced.

In accordance with the standard welding procedures, direct current from a suitable outside source 32 is used as a power source to produce the heat for the welding operation. To start the process, an arc is struck between the end of the electrode 22 and the adjacent surface of the plates 10 and 12 to generate heat sufficient to reduce the adjacent welding wire 26, the tube 22 and the flux 44 thereon to a molten state. As the electrode becomes immersed in the molten metal and flux, the arc will be extinguished so that heat is generated solely by resistance of the molten metal and flux to the passage of electricity therethrough. As the welding phenomena is carried out by the flow of a direct current therethrough, we have discovered that a feeble alternating current is simultaneously generated at the site of the weld that varies inversely with the amount of molten flux or slag. Thus an increase in AC voltage denotes an insufficiency of welding flux at the welding site.

An AC voltmeter 52 is coupled between the consumable guide tube 22 and the element 12 through a capacitor 54 to effectively isolate the AC signal from the DC welding voltage and thus indicate the true AC voltage generated.

It has been observed experimentally that a satisfactory flux depth at the surface of the weld is indicated by an AC voltage or from 0.5–0.8 volts, while a sudden rise in AC voltage above this range indicates insufficient flux at the site of the weld. Upon such an indication it is a simple matter for an operator to manually add an amount of flux that lowers the AC voltage to its predetermined acceptable range and thus produces a satisfactory weldment. While the voltmeter 52 will provide a visual signal, an audible signal or an automatic flux adding device (not illustrated) may be readily incorporated into the arrangement to maintain the proper amount of flux at the weld.

While this invention has been described with reference to the accompanying drawings it is readily understood by those skilled in the art that it permits modification within the scope of the appended claims.

We claim:

1. Apparatus for welding a plurality of spaced parts comprising a tubular consumable electrode extending between said parts, a quantity of welding wire, means for feeding the welding wire through said consumable electrode, a direct current power supply connected to the consumable electrode and to the spaced parts so that a welding current flowing therethrough will produce heat melting the consumable electrode and the adjacent welding wire, means for supplying a welding flux between spaced parts to the point of weld, and an alternating current measuring device intermediate the consumable electrode and the spaced parts indicating the alternating current voltage generated by the welding operation as a function of welding flux present at the point of weld.

2. An electroslag welding apparatus for welding a plurality of spaced parts comprising a tubular guide of welding material extending into the space therebetween, a wire electrode means feeding the wire electrode through the tubular guide to the space between said parts, a DC power supply connected to the wire electrode and to one of said parts to produce resistance heating in the space therebetween, an AC voltmeter, means connecting the AC voltmeter to the wire electrode and one of said parts to indicate the AC voltage produced at the site of the weld, and means for introducing welding flux to the welding site in the space between said spaced parts when the AC voltage generated at the welding site exceeds a predetermined level.

3. The method of determining the adequacy of flux present during an electroslag welding operation comprising the steps of positioning a plurality of metal members with a gap therebetween, placing a consumable electrode in said gap, inserting a quantity of welding flux into said gap adjacent the end of said electrode, connecting a source of direct current to the consumable electrode and to one of the spaced metal members to produce resistance heating therebetween, connecting an alternating current voltmeter to the consumable electrode and one of the spaced metal members to indicate the presence of alternating current generated by the passage of direct current through the flux lying between the electrode and said metal members.

4. The method of determining the adequacy of flux present in an electroslag welding operation as defined in claim 3 including the step of adding additional flux to the point of weld when the alternating current generated exceeds a predetermined amount.

* * * * *